United States Patent
Su

(10) Patent No.: US 9,011,096 B2
(45) Date of Patent: Apr. 21, 2015

(54) VERTICAL AXIS WIND TURBINE BLADE

(76) Inventor: Max Su, Tainan (TW)

( * ) Notice: Subject to any disclaimer, the term of this patent is extended or adjusted under 35 U.S.C. 154(b) by 488 days.

(21) Appl. No.: 13/486,428

(22) Filed: Jun. 1, 2012

(65) Prior Publication Data

US 2013/0323056 A1    Dec. 5, 2013

(51) Int. Cl.
*F03D 3/06* (2006.01)
*F03D 3/02* (2006.01)

(52) U.S. Cl.
CPC ............. *F03D 3/02* (2013.01); *F05B 2240/313* (2013.01); *Y02E 10/74* (2013.01); *F03D 3/067* (2013.01); *F05B 2240/30* (2013.01)

(58) Field of Classification Search
CPC ... F03D 3/067; F03D 3/068; F05B 2240/218; F05B 2240/31; F05B 2240/313
USPC .................. 290/44, 55; 415/4.2, 4.4, 60, 907; 416/41, 98, 110, 111, 117, 119, 120, 416/132 A, 132 B, 146 R, 197 R, 197 A
See application file for complete search history.

(56) References Cited

U.S. PATENT DOCUMENTS

| | | | | | |
|---|---|---|---|---|---|
| 546,185 | A | * | 9/1895 | Park | 416/119 |
| 1,441,774 | A | * | 1/1923 | Adams | 415/162 |
| 2,379,324 | A | * | 6/1945 | Topalov | 415/4.2 |
| 4,204,795 | A | * | 5/1980 | Forrest | 415/211.1 |
| 4,649,284 | A | * | 3/1987 | Hsech-Pen | 290/55 |
| 4,684,817 | A | * | 8/1987 | Goldwater | 290/55 |
| 4,859,146 | A | * | 8/1989 | Labrador | 416/8 |
| 5,266,006 | A | * | 11/1993 | Tsui et al. | 416/119 |
| 2004/0228729 | A1 | * | 11/2004 | Migler | 416/119 |
| 2010/0233919 | A1 | * | 9/2010 | Ersoy | 440/8 |
| 2013/0094967 | A1 | * | 4/2013 | Su | 416/202 |
| 2013/0323056 | A1 | * | 12/2013 | Su | 416/9 |

FOREIGN PATENT DOCUMENTS

| | | | | |
|---|---|---|---|---|
| FR | 669377 A | * | 11/1929 | |
| FR | 2668205 A1 | * | 4/1992 | F03D 3/06 |
| WO | WO 2010145065 A1 | * | 12/2010 | |

* cited by examiner

*Primary Examiner* — Edward Look
*Assistant Examiner* — Christopher R Legendre

(57) ABSTRACT

A vertical axis wind turbine blade is revealed. The vertical axis wind turbine blade includes a blade frame formed by assembly plates disposed at regular intervals and blade bodies each of which pivoted between two adjacent assembly plates. Stoppers are disposed between the assembly plates and the blade bodies. The stopper is used to stop on one side of the blade body corresponding to a downwind surface of the assembly plate. The blade bodies pivotally connected to the blade frame move along with the blade frame to be in an open or a closed position. When the wind blows the upwind surface, the blade body is stopped by the stopper and in the closed position so as to receive the wind power. While the wind blowing the downwind surface, the blade body is in the open position to reduce the wind resistance. Thus the wind turbine efficiency is dramatically improved.

9 Claims, 6 Drawing Sheets

VERTICAL AXIS WIND TURBINE BLADE

BACKGROUND OF THE INVENTION

1. Field of the Invention

The present invention relates to a vertical axis wind turbine blade, especially to a vertical axis wind turbine blade that prevents wind power applied to an upwind surface and a downwind surface at the same time so as to increase the power generation efficiency of the wind turbine.

2. Description of Related Art

Generally, a wind turbine set uses wind-wheels to receive wind power and then convert the wind power to electricity. Now a vertical wind turbine is used to convert kinetic energy from air to mechanical energy and transmit the mechanical energy to generator sets for electricity production. A plurality of helical blades is connected to a rotor. By the design of the blades, wind acts on the blades to drive the rotor and the rotor is connected to generator sets. As a result, the kinetic energy of the air is converted to electric power. However, helical blades of the vertical axis wind turbines available now include upwind surfaces and downwind surfaces and the resistance over the whole downwind surface caused by wind is quite large. Thus the resistance is opposite to the pushing force over the whole upwind surface caused by wind and the opposing forces cancel each other partially. Therefore the power generation efficiency of the wind turbine is lowered.

SUMMARY OF THE INVENTION

Therefore it is a primary object of the present invention to provide a vertical axis wind turbine blade that prevents the wind from :acting on an upwind surface and a downwind surface of blades simultaneously so as to increase wind turbine efficiency dramatically.

In order to achieve the above object, a vertical axis wind turbine blade of the present invention includes a blade frame formed by a plurality of assembly plates disposed at regular intervals, and a plurality of blade bodies each of which are configured to pivot between two adjacent assembly plates. The blade body consists of a rib and a blade surface connected to the rib. Both the rib of the blade body and the assembly plate of the blade frame are arranged with a pivot hole correspondingly. A pivot rod is passed through the pivot hole of the rib of the blade body and the pivot hole of the assembly plate of the blade frame. Moreover, a stopper is arranged between the assembly plate and the blade body. Two sides of the assembly plate are an upwind surface and a downwind surface respectively. The stopper is stopped on one side of the blade body corresponding to the downwind surface of the assembly plate.

Thereby the pivotally connected blade bodies moves along with the blade frame to be in an open or a closed position. When the wind blows the upwind surface of the assembly plate, the blade body is in the closed position to receive the wind power effectively. When the wind blows the downwind surface, the blade body is in the open position to reduce the wind resistance. Thereby the wind will not act on the upwind surface and the downwind surface of the blade simultaneously so that the resistance and the pushing force will not cancel each other. Therefore the wind turbine efficiency is dramatically improved.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
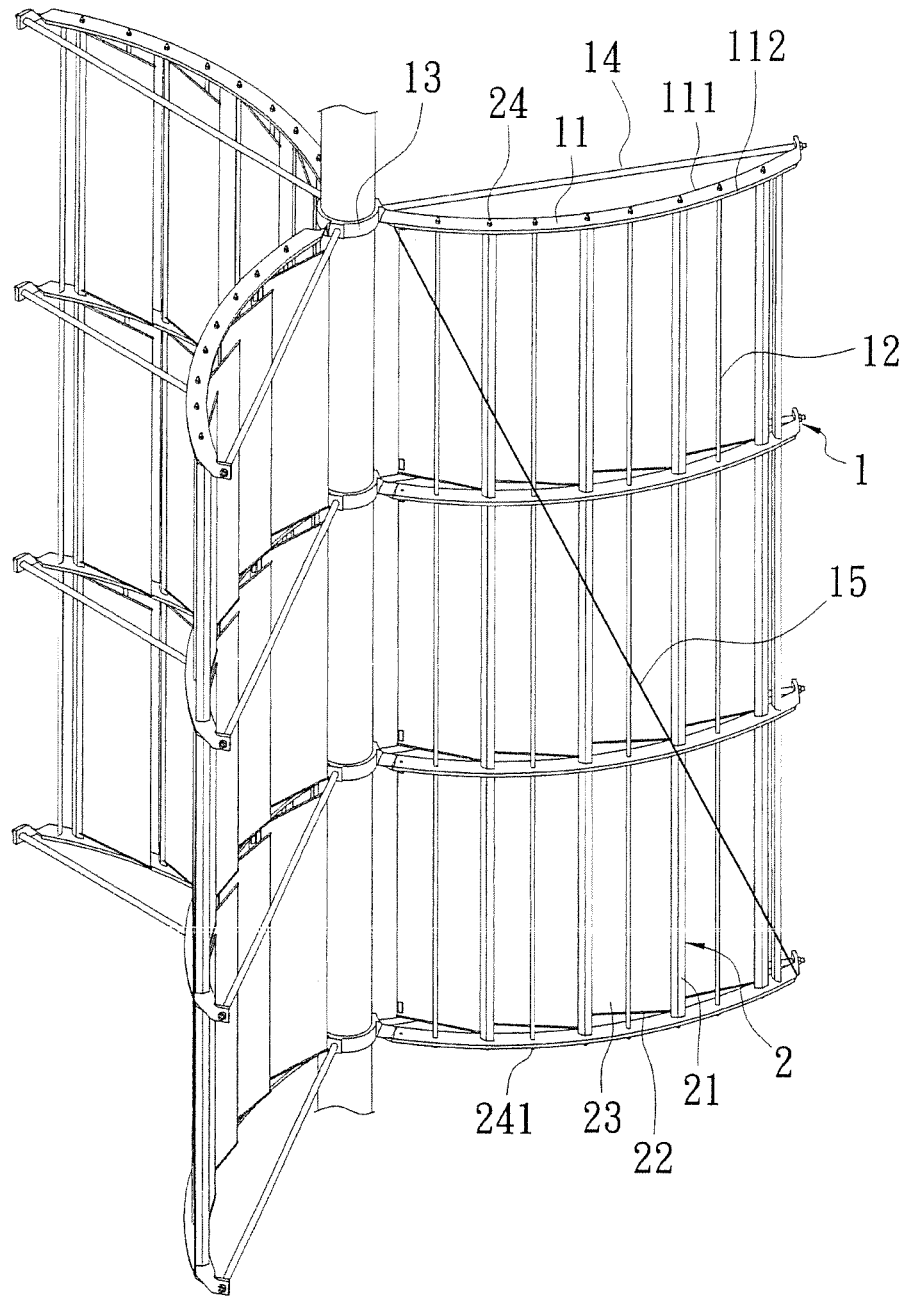
FIG. 1 is a perspective view of an embodiment according to the present invention.
Figure 2:
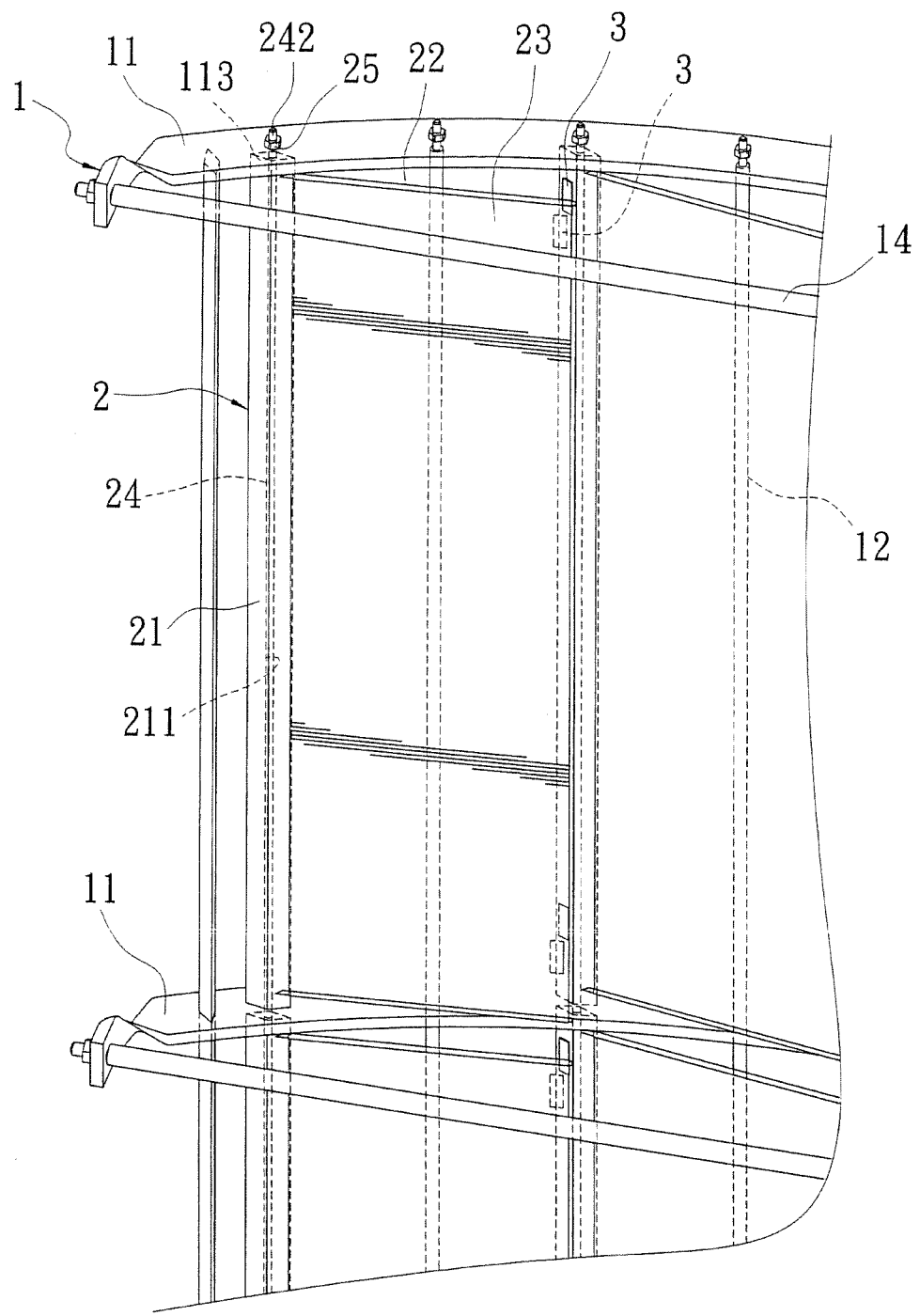
FIG. 2 is a partial enlarged view of an embodiment according to the present invention.
Figure 3:
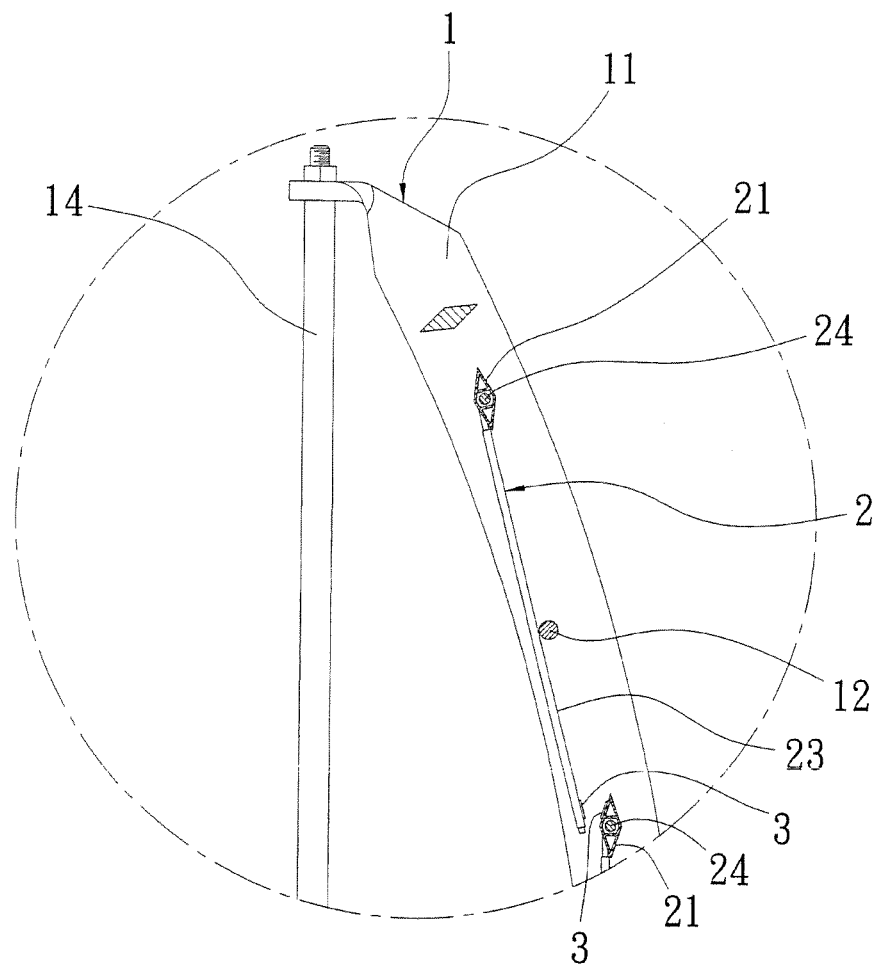
FIG. 3 is a partial cross-sectional view of an embodiment according to the present invention.

Referring to FIG. 1 to FIG. 3, a vertical axis wind turbine blade according to the present invention includes a blade frame 1, a plurality of blade bodies 2 and a plurality of buffer parts 3.

The blade frame 1 includes a plurality of assembly plates 11 arranged horizontally from top to bottom at regular intervals. The assembly plate 11 is curved and has a concave-curved upwind surface 111 and a convex-curved downwind surface 112 on two sides thereof respectively. A plurality of stoppers 12 is disposed between the assembly plates 11. The assembly plate 11 includes a pivot hole 113 between the two stoppers 12. One end of the assembly plate 11 is disposed with and connected to an axial sleeve 13 that, is ring-shaped while a support rod 14 is arranged between the axial sleeve 13 and the other end of the assembly plate 11. The support rod 14 is over the upwind surface 111 of the assembly plate 11. A reinforcing rope 15 is arranged between one end of the highest assembly plate 11 and the other end of the lowest assembly plate 11. Or one end of the reinforcing rope 15 is bound to a shaft 4 that is enclosed by the axial sleeve 13 of the highest assembly plate 11 while the other end of the reinforcing rope 15 is bound to the other end of the lowest assembly plate 11 opposite to the axial sleeve 13 of the lowest assembly plate 11.

The blade body 2 arranged between two adjacent assembly plates 11 consists of a rib 21, connection rods 22, a blade surface 23, a pivot rod 24 and a nut 25. The shape of the rib 21 is rhomboid so as to reduce wind resistance while the wind passes by the rhombus rib 21. The top and the bottom of the rib 21 are respectively connected to the connection rods 22 and the blade surface 23 is arranged between the two connection rods 22. The rib 21 includes a pivot hole 211 corresponding to the pivot hole 113 of the assembly plate 11 of the blade frame 1. As to the pivot rod 24, it is passed through the pivot hole 113 of the assembly plate 11 of the blade frame 1 and the pivot hole 211 of the rib 21 of the blade body 2. One end of the pivot rod 24 is a fixed end head 241 against the lowest assembly plate 11 of the blade frame 1 while the other end thereof is disposed with a threaded segment 242. The threaded segment 242 penetrates the highest assembly plate 11 of the blade frame 1 to be threaded with and fixed by the nut 25. One side of the blade body 2 corresponding to the downwind surface 112 of the assembly plate 11 is contacted with and stopped by the stopper 12.

The buffer part 3 is disposed on the blade surface 23 of the blade body 2 and on the rib 21 of another blade body 2 that is in contact with the blade body 2 with the blade surface 23 respectively. The buffer part 3 on the blade surface 23 of the blade body 2 is corresponding to the buffer part 3 on the rib 21 of another blade body 2. For example, the buffer parts 3 can be magnets with opposite polarities.

Figure 4:
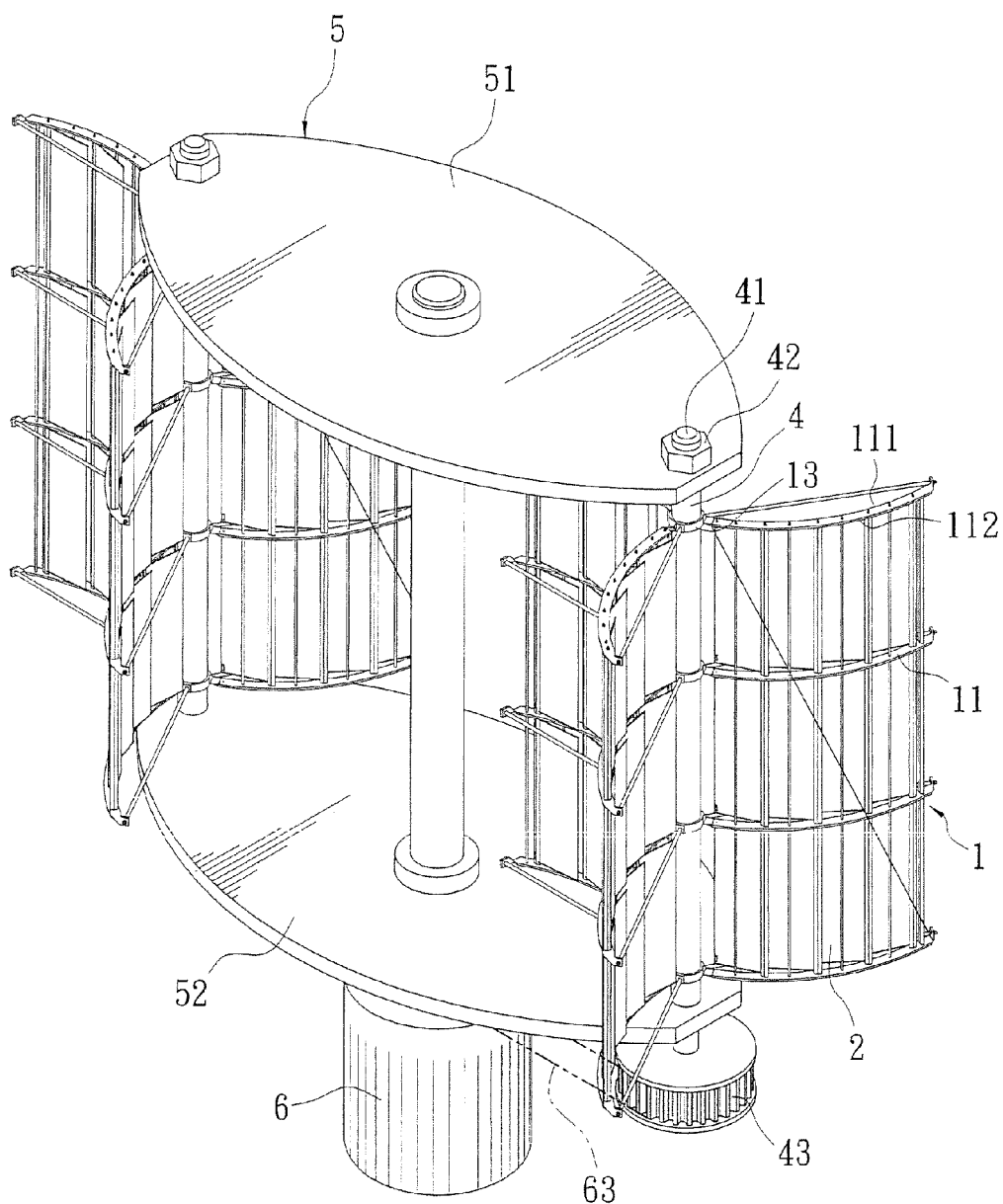
FIG. 4 is a perspective view of an embodiment assembled with a wind turbine generator set according to the present invention.
Figure 5:
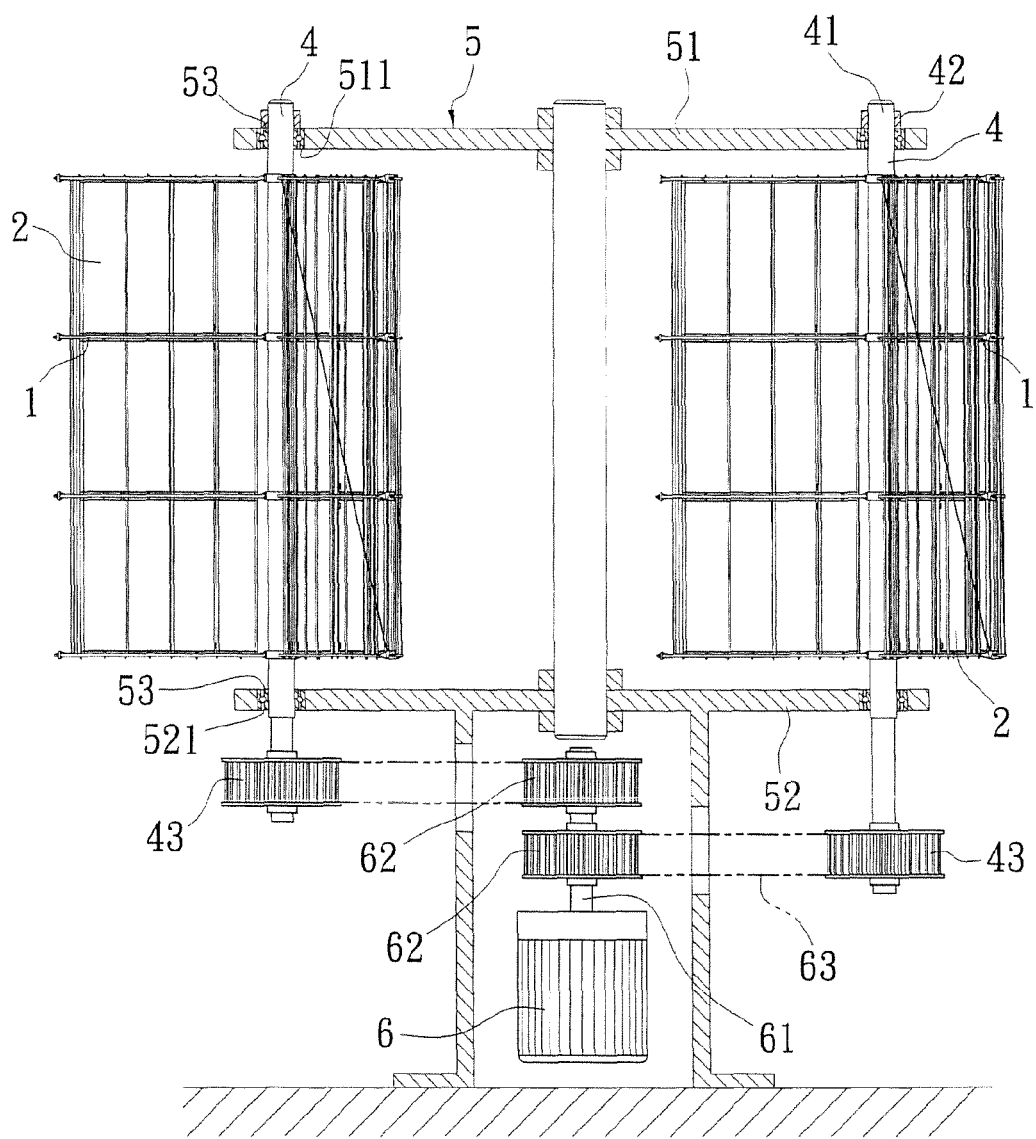
FIG. 5 is a cross sectional view of an embodiment assembled with a wind turbine generator set according to the present invention.
Figure 6:
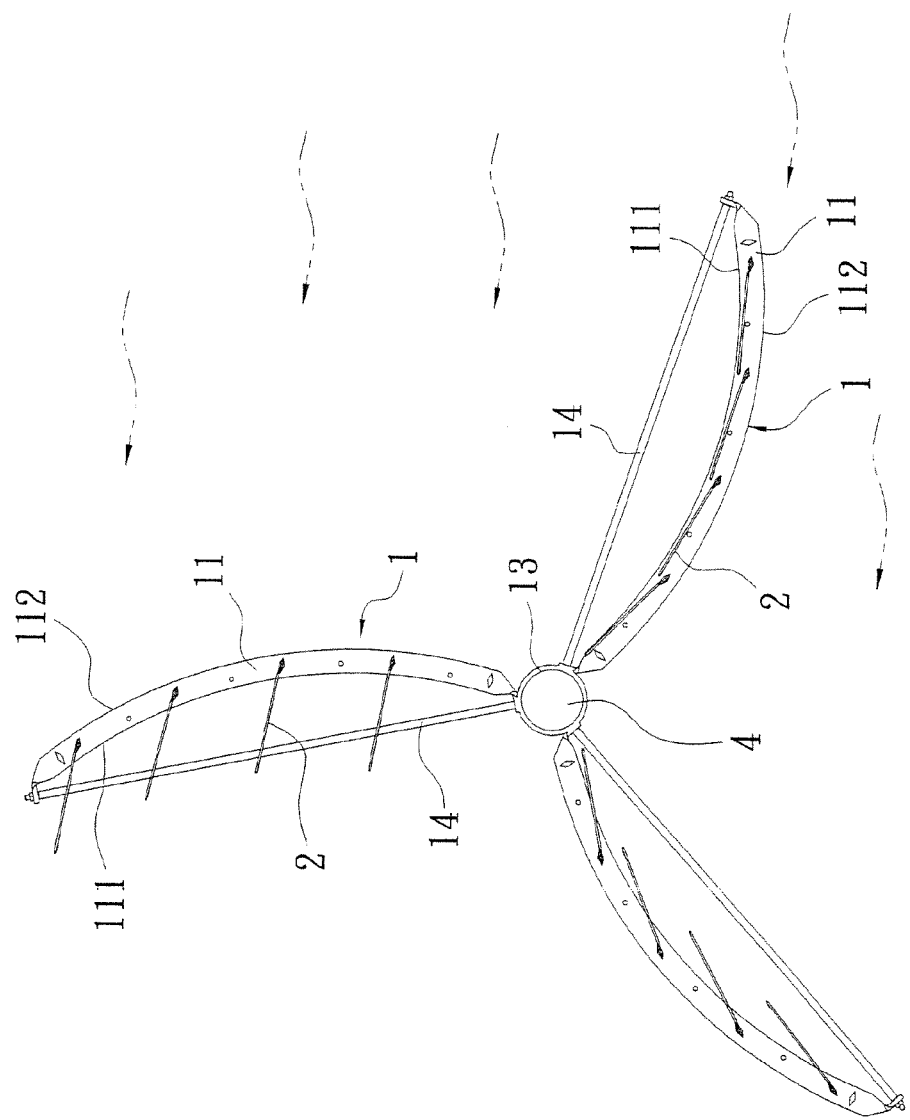
FIG. 6 is a schematic drawing showing an embodiment in used according to the present invention.

Referring to FIG. 4 and FIG. 5, the blade is assembled onto a wind turbine generator set by inserting the shaft 4 of the wind turbine generator set through the axial sleeve 13 on one end of the assembly plate 11 of the blade frame 1. Then a plurality of shafts 4 with the blades is disposed between an upper fixing plate 51 and a lower fixing plate 52 of a generator bracket 5. The top end of the shaft 4 penetrates a pivot hole 511 of the upper fixing plate 51 and then a threaded segment 41 arranged at the top end of the shaft 4 is threaded and fixed by a nut 42. The bottom end of the shaft 4 is put through a pivot ole 521 of the lower fixing plate 52. A shaft 53 is disposed between the pivot hole 511 of the upper fixing plate 51 and the shaft 4, and between the pivot hole 521 of the lower fixing plate 52 and the shaft 4. A drive wheel 43 is arranged at the bottom end of the shaft 4 penetrating the lower fixing plate 52. The drive wheel 43 of the shaft 4 and a drive wheel 62 on a main shaft 61 of a generator 6 are connected to each other by a drive belt 63 wound around them. The drive wheel 43 can be a gear and the drive wheel 62 can also be a gear. As to the drive belt 63, it can be a synchronous belt. Thus the assembly of the blade with the wind turbine generator set is completed Referring to FIG. 6, while the wind blowing the blade of the present invention and flowing through the upwind surface 111 of the assembly plate 11 of the blade frame 1, the blade body 2 on the upwind surface 111 of the assembly plate 11 is pushed by the wind to be against the stopper 12 between the two adjacent assembly plates 11 and positioned. At this moment, the blade body 2 is in a closed position. Thus a whole upwind surface for receiving wind power is formed and is pushed by the wind. Along with the wind, the blade of the present invention drives the shaft 4 connected with the blade frame 1 to rotate. By the drive wheel 43 on the bottom end of the shaft 4 and the drive belt 63, the drive wheel 62 of the generator 6 is further driven so as to make the main shaft 61 of the generator 6 rotate synchronously. By the generator 6, the kinetic energy from the wind is converted into mechanical energy for producing electricity.

Along with the rotation of the shaft 4 driven by the blade, the blades connected to the shaft 4 also have angular displacement. The upwind surface 111 of the assembly plate 11 of the blade frame 1 originally toward the direction from which the wind blows gradually turns to the opposite direction, against the direction where the wind is blowing. Now the downwind surface 112 of the assembly plate 11 of the blade frame 1 is in the direction from which the wind blows. At the same time, the blade body 2 originally arranged on the upwind surface 111 of the assembly plate 11 of the blade frame 1, against the stopper 12 and positioned in the closed position is pushed by the wind flowing through the downwind surface 112 and is gradually released from the stopper 12 to be in an open position. Thus the wind blowing through the downwind surface 112 is passing through the blade body 2 in the open position smoothly. Therefore the resistance over the downwind surface 112 of the blade being blown is completely gone. The blade of ;the present invention rotates smoothly and the wind turbine efficiency is increased.

Moreover, when the blade of the present invention rotates along with the shaft 4 and the upwind surface 111 of the blade frame 1 is toward the direction the wind blows, the blade body 2 assembled with the blade frame 1 is pushed again by the wind and is moved toward the stopper 12 to be in the closed position. When the blade body 2 is gradually closed, the blade surface 23 of the blade body 2 hits the rib 21 of another blade body 2 adjacent. At this moment, by the buffer parts 3 disposed on the blade surface 23 of the blade body 2 and on the rib 21 of the adjacent blade body 2 with opposite polarities, the impact of the blade body 2 changing from the open position to the closed position is reduced. Thus impact damage of the two adjacent blade bodies 2 caused by frequent opening and closing can be avoided. The noises from bumps of the blade bodies during operation can also be reduced.

Furthermore, when the blade body 2 is worn out or damaged after being used for a long time, the nut 25 threaded on the pivot rod 24 of the damaged blade body 2 is unscrewed and the pivot rod 24 is removed from the damaged blade body 2. Thus the damaged blade body 2 is separated with the blade frame 1. Then the pivot hole 211 of the rib 21 of a new blade body 2 is inserted by the pivot rod 24 and next the nut 25 is screwed onto the threaded segment 242 on the end of the pivot rod 24. The blade body 2 is replaced conveniently.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:

1. A vertical axis wind turbine blade comprising:
   a blade frame having a plurality of assembly plates disposed at regular intervals; and
   a plurality of blade bodies each of which are configured to pivot between two adjacent assembly plates and having a rib and a blade surface connected to the rib;
   wherein each rib of each blade body and each assembly plate of the blade frame are respectively arranged with a pivot hole correspondingly; a pivot rod is passed through the pivot holes of each rib of each blade body and each assembly plate of the blade frame; a stopper is arranged between each assembly plate and each blade body while two sides of each assembly plate are respectively an upwind surface and a downwind surface; each stopper is located on one side of each blade body corresponding to the downwind surface of each assembly plate; and wherein a first buffer part is disposed on a first blade body; and a second buffer part is disposed on a second blade body adjacent to said first blade body and said second buffer part is configured to correspondingly contact said first buffer part.

2. The vertical axis wind turbine blade as claimed in claim 1, wherein each stopper is arranged between two adjacent assembly plates and between two adjacent blade bodies.

3. The vertical axis wind turbine blade as claimed in claim 1, wherein each assembly plate of the blade frame is curved and having a concave-curved upwind surface and a convex-curved downwind surface on two sides thereof respectively; the concave-curved upwind surface and the convex-curved downwind surface are corresponding to each other.

4. The vertical axis wind turbine blade as claimed in claim 1, wherein the first buffer part on the first blade body and the second buffer part of the second blade body adjacent to the first blade body are magnets with opposite polarities.

5. The vertical axis wind turbine blade as claimed in claim 1, wherein one end of each pivot rod of each blade body is a fixed end head while the other end of each pivot rod is disposed with a threaded segment that is screwed and fixed by a nut.

6. The vertical axis wind turbine blade as claimed in claim 5, wherein the cross-sectional shape of each rib of each blade body is a rhombus.

7. The vertical axis wind turbine blade as claimed in claim 1, wherein one end of each assembly plate of the blade frame is connected to a ring-shaped axial sleeve.

8. The vertical axis wind turbine blade as claimed in claim 1, wherein a reinforcing rope is arranged between the assembly plate on a top end and the assembly plate on a bottom end; a first end of the reinforcing rope is connected to the assembly plate on the top end, and a second end of the reinforcing rope is connected to the assembly plate on the bottom end diagonally opposite to said first end of the reinforcing rope.

9. The vertical axis wind turbine blade as claimed in claim 8, wherein a support rod is disposed between two ends of each assembly plate of the blade frame.

\* \* \* \* \*